Jan. 12, 1960 E. M. SÖDERBERGH 2,920,394
PLURAL TAPE MEASURING DEVICE
Filed March 4, 1957
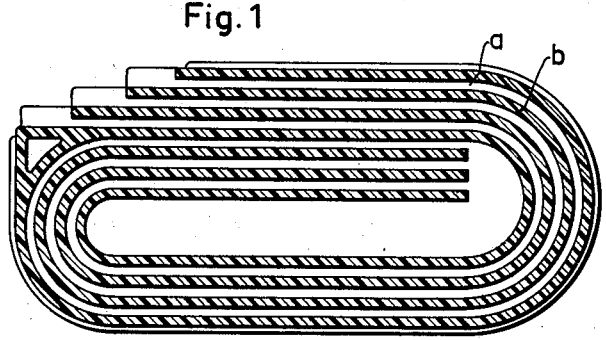
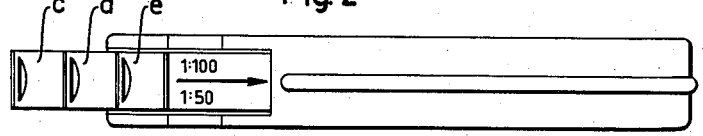
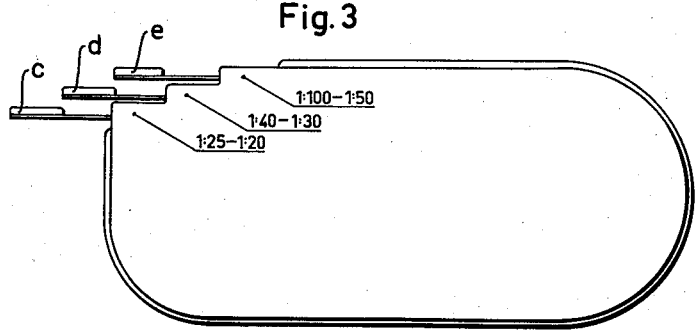
Inventor:

United States Patent Office 2,920,394
Patented Jan. 12, 1960

2,920,394

PLURAL TAPE MEASURING DEVICE

Edgon M. Söderbergh, Stockholm, Sweden

Application March 4, 1957, Serial No. 643,601

2 Claims. (Cl. 33—138)

The present invention generally relates to measuring instruments and more particularly to measuring devices of the kind comprising reduction scales, tapes and the like.

The primary object of the invention is to provide a measuring device comprising a plurality of scales which can be received within an extremely restricted space and in a manner to make them readily available for use in reading drawings and similar purposes.

Several types of measuring rods are previously known. These consist of ruler-like rigid rods having different graduated spaces, or scales, marked along their edges. The drawback of these well-known measuring rods resides in that it is difficult to have them readily available at any time because, due to their considerable length, they cannot be carried in pockets or the like. Particularly at building sites there is often a requirement that scales be readily available, since figuring in accordance with drawings must frequently be carried out right at the building site. The same is often true as regards the field of engineering industry.

Accordingly, there has long been a demand for a simple and practical arrangement in which said drawback has been overcome to a maximum extent.

For the object stated, the measuring device according to the invention is mainly characterized in that it comprises a flat case having two spaced parallel sidewalls which are interconnected by a plurality of partitions which are spirally curved in their longitudinal direction, any two adjacent such partitions forming between them a passage, these passages being also spirally curved in their longitudinal direction and opening at the peripheral edge of the case, each such passage receiving a longitudinally displaceable flexible ruler or tape having graduated scales applied to it.

One embodiment of the invention will now be described by way of example, reference being had to the accompanying drawing, in which:

Fig. 1 is a central section through the case of the device, not showing the scale tapes, Fig. 2 is a top plan view of the device, and Fig. 3 is a side view of the device.

Referring to the accompanying drawing more specifically, the letter $a$ designates one of the spirally shaped passages which are formed in the interior of the case, the latter comprising two spaced parallel flat and elongated side walls having rounded ends. The passages $a$ are separated from each other by spirally curved partitions $b$, the passages being rectangular in cross-sectional shape and forming within the case a plurality of labyrinths which are open at their outer ends, i.e. at the peripheral edge of the case. The case is preferably made of nylon or of other plastic material reinforced with glass fibers and the case is a two-part molding having its parts glued together. In the embodiment illustrated in the accompanying drawing, three spaced parallel passages $a$ are arranged in a nested interrelation. In each such passage $a$ a ruler or tape $c$, $d$, $e$, respectively, made of a transparent and flexible but comparatively stiff material is received so as to be longitudinally displaceable therein. These rulers or tapes $c$, $d$, $e$ carry graduated scales, two such scales being carried on each tape. In this way, the measuring device will comprise six different scales within the case. In order to enable the scale-carrying tapes to be extended from and pushed into the case, the tapes are provided at their outer ends with enlargements or projections which serve both as finger grips and as positive stops in cooperation with the extreme ends of the partitions $b$ so as to prevent the tapes from being inadvertently pushed completely into their passages $a$. Thus, in operation, it is a very simple matter to pull out the tape carrying the scale which it is actually desired to use. It is not necessary, of course, to pull out the tape completely from the case, but only to an extent as necessary to make the reading concerned. After use, it is an extremely simple matter to push the scale into the case again.

It is possible, of course, to provide the case with any desired number of passages for the reception of further tapes carrying different scales. It is possible also to make both the case and the tapes of steel or any suitable other material.

It is understood that the invention is not restricted to the embodiments described hereinbefore and as illustrated in the accompanying drawing, the same being susceptible of several variations or modifications within the scope of the appended claims.

What I claim is:

1. A measuring device comprising in combination a flat and somewhat oblong casing with rounded ends and having spaced parallel top and bottom wall portions which are interconnected by a plurality of elongated fins, said fins extending substantially parallel to one another in a spirally curved manner, substantially from one edge of said casing, the outermost fin of the spiral providing the outer side wall of said casing, and said fins being spaced from one another in a manner to form therebetween a number of spiral passages, and a plurality of reduction scale tapes, each slidably received in its spiral passage and adapted to be pulled out at least partly for measuring purposes.

2. A measuring device as in claim 1, wherein said tapes are made of a transparent material and have at their outer ends enlargements or projections serving as fingergrips when pulling out said tapes from the casing for measuring purposes.

References Cited in the file of this patent

UNITED STATES PATENTS

| | | |
|---|---|---|
| 2,142,387 | Udell | Jan. 3, 1939 |
| 2,172,043 | Wolf | Sept. 5, 1939 |
| 2,185,443 | Kreutz | Jan. 2, 1940 |
| 2,237,737 | Houston | Apr. 8, 1941 |
| 2,484,341 | Grover | Oct. 11, 1949 |
| 2,548,323 | Shimizu | Apr. 10, 1951 |

OTHER REFERENCES

General Catalogue, C-Thru Ruler Co., Hartford, Conn. 16 pages, page 4 relied on, printed December 1949; received by the Patent Office April 20, 1953. (Copy in Div. 66.)